United States Patent
Asenjo et al.

(10) Patent No.: US 9,792,912 B2
(45) Date of Patent: Oct. 17, 2017

(54) METHOD FOR VERIFYING THE IDENTITY OF A SPEAKER, SYSTEM THEREFORE AND COMPUTER READABLE MEDIUM

(75) Inventors: Marta Sánchez Asenjo, Madrid (ES); Marta Garcia Gomar, Madrid (ES)

(73) Assignee: AGNITIO SL, Madrid (ES)

( * ) Notice: Subject to any disclaimer, the term of this patent is extended or adjusted under 35 U.S.C. 154(b) by 1220 days.

(21) Appl. No.: 13/381,076

(22) PCT Filed: Jun. 26, 2009

(86) PCT No.: PCT/EP2009/004649
§ 371 (c)(1),
(2), (4) Date: Dec. 27, 2011

(87) PCT Pub. No.: WO2010/066310
PCT Pub. Date: Jun. 17, 2010

(65) Prior Publication Data
US 2012/0173239 A1    Jul. 5, 2012

(30) Foreign Application Priority Data

Dec. 10, 2008  (EP) .................. PCT/EP2008/010478

(51) Int. Cl.
*G10L 17/00* (2013.01)
*G10L 17/02* (2013.01)
(Continued)

(52) U.S. Cl.
CPC .............. *G10L 17/00* (2013.01); *B66B 13/26* (2013.01); *G10L 17/02* (2013.01); *G10L 17/06* (2013.01); *G10L 17/24* (2013.01); *G10L 17/26* (2013.01)

(58) Field of Classification Search
CPC ......... G10L 17/00; G10L 17/06; G10L 17/08; G10L 17/22; G10L 17/24
See application file for complete search history.

(56) References Cited

U.S. PATENT DOCUMENTS 4,534,056 A * 8/1985 Feilchenfeld et al. ........ 704/272
5,265,191 A * 11/1993 McNair ................... G10L 17/22
704/200

(Continued)

FOREIGN PATENT DOCUMENTS

| EP | 0533396 A2 | 3/1993 |
| GB | 2388947 A | 11/2003 |
| WO | WO 9334216 A2 | 8/1998 |

*Primary Examiner* — Eric Yen
(74) *Attorney, Agent, or Firm* — Galvin Patent Law LLC; Brian R. Galvin

(57) ABSTRACT

The invention refers to a method of verifying the identity of a speaker based on the speakers voice comprising the steps of: receiving (1, 5) a first and a second voice utterance; using biometric voice data to verify (2, 6) that the speakers voice corresponds to the speaker the identity of which is to be verified based on the received first and/or second voice utterance and determine (8) the similarity of the two received voice utterances characterized in that the similarity is determined using biometric voice characteristics of the two voice utterances or data derived from such biometric voice characteristics. The invention further refers to a System (80) for verifying the identity of a speaker based on the speakers voice comprising: a component (81) for receiving a first and a second voice utterance; a component (82) for using biometric voice data to verify that the speakers voice corresponds to the speaker the identity of which is to be verified based on the received first and/or second voice utterance and a component (83) for comparing the two received voice utterances in order to determine the similarity of the two voice utterances characterized in that the similarity is determined using biometric voice characteristics of the two voice utterances or data derived from such biometric voice characteristics.

2 Claims, 7 Drawing Sheets

Figure 1:
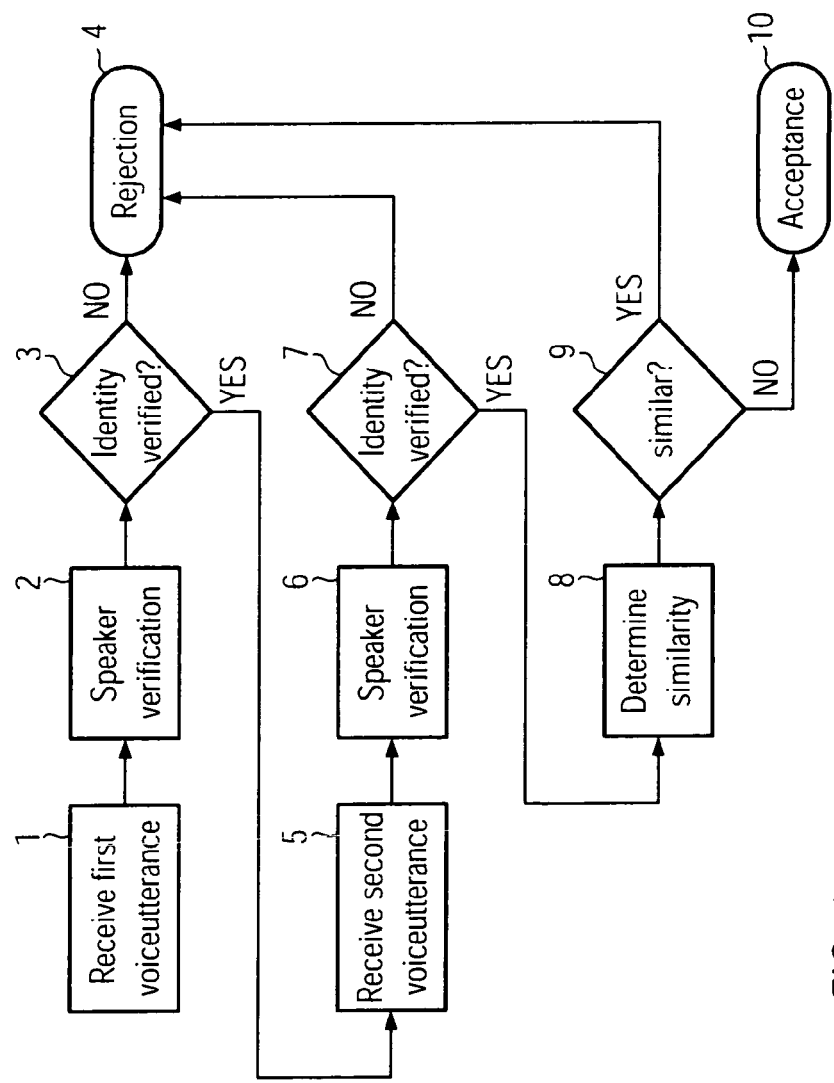

(51) Int. Cl.
*G10L 17/06* (2013.01)
*G10L 17/24* (2013.01)
*G10L 17/26* (2013.01)
*B66B 13/26* (2006.01)

(56) References Cited

U.S. PATENT DOCUMENTS

| | | | | |
|---|---|---|---|---|
| 5,450,524 | A | * | 9/1995 | Rissanen ........................ 704/245 |
| 5,526,465 | A | * | 6/1996 | Carey et al. .................... 704/250 |
| 5,548,647 | A | * | 8/1996 | Naik et al. ...................... 704/200 |
| 5,752,231 | A | * | 5/1998 | Gammel .................. G10L 17/00 704/200 |
| 5,806,040 | A | * | 9/1998 | Vensko ............... G06Q 20/4014 704/233 |
| 6,978,238 | B2 | * | 12/2005 | Wohlsen et al. ............... 704/246 |
| 2003/0014247 | A1 | * | 1/2003 | Ng ........................... G10L 17/06 704/209 |
| 2003/0200447 | A1 | | 10/2003 | Sjoblom |
| 2005/0063522 | A1 | * | 3/2005 | Kim ...................... H04M 1/271 379/88.02 |
| 2007/0239451 | A1 | * | 10/2007 | Luan ........................ G10L 17/04 704/246 |
| 2008/0172230 | A1 | | 7/2008 | Hayakawa |

\* cited by examiner

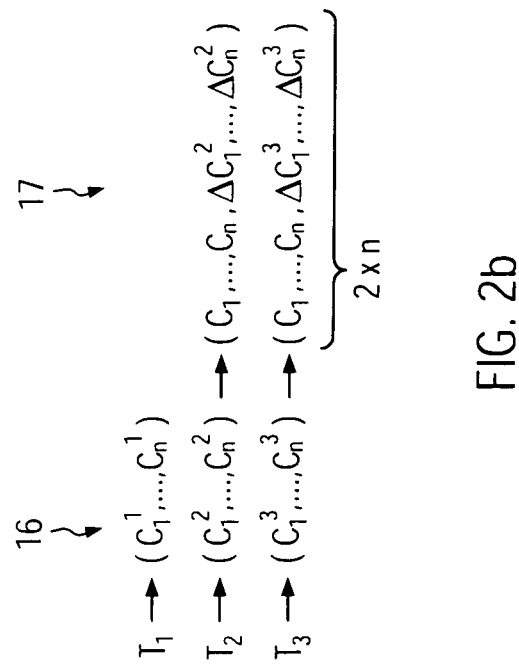
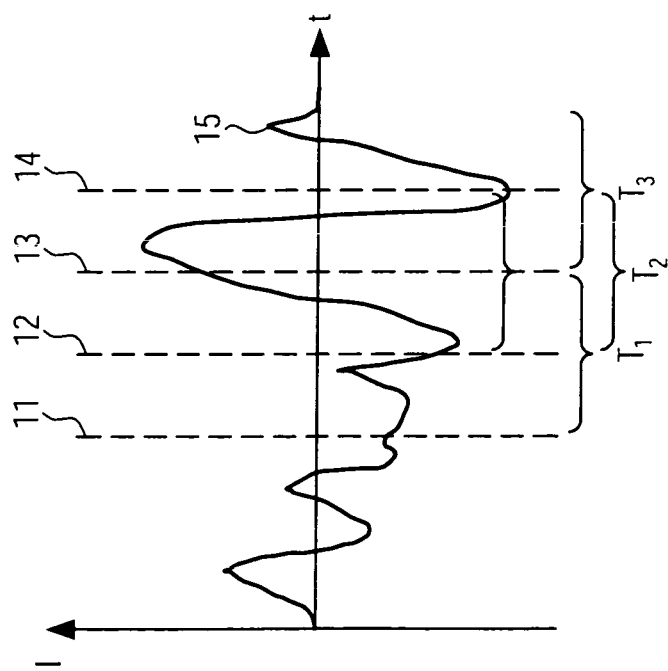
FIG. 2b
FIG. 2a

METHOD FOR VERIFYING THE IDENTITY OF A SPEAKER, SYSTEM THEREFORE AND COMPUTER READABLE MEDIUM

CROSS-REFERENCE TO RELATED APPLICATIONS

The present invention is a continuation-in-part of co-pending and commonly-owned U.S. patent application Ser. No. 12/998,870, titled "METHOD FOR VERIFYING THE IDENTITY OF A SPEAKER AND RELATED COMPUTER READABLE MEDIUM AND COMPUTER", filed on Jun. 10, 2011, which is the national stage entry of and claims priority to PCT application serial number PCT/EP2008/010478, with the same title, filed on Dec. 10, 2008. The disclosure of each of the above-referenced patent applications is hereby incorporated by reference in its entirety.

The disclosure of the co-owned PCT application with the application number PCT/EP 2008/010478 filed on Dec. 10, 2008 with the European Patent Office is fully incorporated herewith by reference. Further the priority of this application according to the Paris convention is claimed.

The present invention refers to a method for verifying the identity of a speaker based on the speaker's voice.

Verification of the identity of a speaker is used, for example, for accessing online banking systems or any other system where the identity of the speaker needs to be verified. The verification of the identity of the speaker refers to the situation where someone pretends to have a certain identity, and it needs to be checked that the person indeed has this identity.

Identification of the speaker based on the speaker's voice has particular advantages, since biometric voice data can be extracted from the speaker's voice with such a degree of accuracy that it is practically impossible by any other speaker to imitate another person's voice with a sufficient degree of accuracy in order to perform fraud.

Nevertheless in order to perform fraud it may be conceivable to record a person's voice and use this recording to try to access a system in a fraudulent way.

In order to determine whether or not a voice utterance received by an access control system is a previously recorded voice utterance a speaker may be requested to repeat the same voice utterance. Then the two receives voice utterances may be compared in order to find out whether or not they are suspiciously similar which could be used as an indicator that the voice utterance is a previously recorded one.

A fraudulent person could think of this kind of check and may try to circumvent it by slightly changing the second voice utterance. Here in particular the prosody may be changed such that the second voice utterances is found to be different from the first one. The speech velocity, the pitch or the like may for example be changed.

The object of the present invention is to provide a method and a system which allows to make fraudulent access difficult based on a recorded or synthesized voice utterance.

The object is met with a method according to claim 1, a computer readable medium of claim 13 and a system of claim 14.

Preferred embodiments are disclosed in the dependent claims.

According to the method, two voice utterances are received. These two voice utterances may be requested directly to a speaker or the second voice utterance may be requested after having received the first voice utterance. The speaker may, for example, be requested to repeat twice one, two or more code words, any one, two or more words, one, two or more texts, one, two or more text portions, one, two or more numbers, one, two or more digits, one, two or more phrases, one, two or more letters or combinations thereof. In another embodiment he may be requested to repeat a previous (first) voice utterance emitted by the speaker after this voice utterance having been received. The received voice utterances may be for example access key words or sentences or any kind of texts, which was agreed with the speaker beforehand. It may nevertheless also be a text which is dynamically generated during one access procedure and is not previously agreed with the speaker.

In a particular preferred embodiment, a second voice utterance is only requested in case that with respect to the first voice utterance some doubts concerning the authenticity of this voice utterance are found, e.g. in a passive test for falsification; see above-mentioned PCT/EP2008/010478 for details of a passive test for falsification.

Biometric voice data are used to verify that the speaker's voice corresponds to the speaker the identity of which is to be verified. In some way the speaker has provided information concerning his identity, for example by providing an identification (number) or the like and this pretended identity is to be checked.

The similarity between the two received voice utterances is determined.

In case that a voice utterance is recorded in order to perform fraud, this voice utterance may be replayed such that the biometric voice data check will indicate that the speaker's voice corresponds to the speaker the identity of which is to be verified. Since the second voice utterance is requested to the user, either by directly requesting two voice utterances or by requesting repeating the first voice utterance the two received voice utterances may be check against each other in order to find out whether the two received voice utterances are based on one and the same recording or one and the same synthesis.

It can be thought of performing such a comparison of two voice utterances based on general acoustic properties of the voice utterance such as audio intensity, evolution thereof during time or the like.

In case a fraudulent person wishes to overcome a check for the determination of the similarity, he may change those acoustic characteristics usually in an easy way. Thereby a second voice utterance can be generated based on the first voice utterance, which on an audio information level is found to be different, and however preserves the biometric characteristics of the voice utterance and thus may be able to gain access to the system.

In order to avoid such possibility the similarity of the two voice utterances is determined using biometric voice characteristics of the two voice utterances. In this way, a fraudulent manipulation of the second voice utterance is made more difficult since simple manipulations such as changing the tempo, speed or pitch, which, however, do not affect biometric voice characteristics, are not sufficient in order to cheat the similarity test.

On the other hand, in case that the manipulations to obtain the second voice utterance are very strong, and hence, the similarity is found to be insignificant for considering the second voice utterance as falsified, this can be identified by verifying the second voice utterance and/or in particular both voice utterances by using biometric voice data in order to verify that the speaker's voice corresponds to the speaker the identity of which is to be verified.

Therefore, an embodiment in which a first and the second voice utterances are processed using biometric voice data to verify that the speaker's voice corresponds to the speaker the identity of which is to be verified, the similarity between the two voice utterances using biometric voice characteristics of the two voice utterances are particularly fraud resistant. In order to access such a system the two voice utterances have to be within the limits imposed by the biometric voice data verification and furthermore the two voice utterances have to be sufficiently different in order not to be suspected for being falsified due to having very similar biometric voice characteristics.

In case the second voice utterance is provided by a lively speaking (non-fraudulent) person, the biometric voice data will always be slightly (and sufficiently) different from the first utterance.

To base the check of similarity on biometric voice data gives a particularly high degree of fraud resistance because not any change to the second voice utterance in comparison to the first voice utterance leads to the similarity check identifying a low similarity but only those that do affect the biometric voice characteristics. This method offers the particular advantage that a fraudulent person would require inside knowledge of which kind of biometric voice characteristic is checked in the similarity test in order to be able to change the second voice utterance such that it is found to be sufficiently different from the first voice utterance. Since such information can be hidden and is not easily recognizable from the outside fraud resistance is particularly high. Further even if he would know, which characteristic would be checked he would still find difficulties in changing the recorded or synthesized voice utterance in order to have a desired difference in the biometric voice characteristic of the second voice characteristic, since the manipulation of the voice utterance in this respect is not easy. Above all such changes are not allowed to be of such a kind that the verification that the speakers voice corresponds to the speaker the identity of which needs to be checked fails. If changes to the second voice utterance that modify the biometric voice characteristics are very strong than the verification that the speakers voice corresponds to the speaker the identity of which is to be verified would give a negative result which means that the access will not be granted.

In a preferred embodiment, the second voice utterance is requested from the speaker after having used biometric voice data to verify that the speaker's voice corresponds to the speaker the identity of which is to be verified based on the first voice utterance. Here the speaker is requested to repeat the voice utterance in order to receive the second voice utterance. In this case, the speaker is not always annoyed by having to repeat certain utterances since the second voice utterance is only requested in case that the first test is already passed (verification that the speaker's voice corresponds to the speaker the identity of which is to be verified).

Further, in a particular embodiment biometric voice data are extracted from the two voice utterances. The same extracted data are preferably used as the biometric voice data for verifying that the speaker's voice corresponds to the speaker the identity of which is to be verified and as the biometric voice characteristics used for determining the similarity of the two voice utterances. Hereby, it is assured that the particular biometric voice data which need to be in a certain range in order for the speaker to be accepted are the ones that are also checked against having a suspicious similarity.

In order to determine the similarity of the two received voice utterances, however, other data or characteristics different from the ones used for verification of the speaker's identity may be derived which are used therefore.

Further, in a preferred embodiment biometric voice characteristics are determined for different times within the two voice utterances. This means that for each voice utterance, the biometric voice characteristics are determined more than once each time referring to a different time within the voice utterance. Thereby, the temporal evolution of a biometric voice characteristic can be determined and used in order to determine a similarity. Time resolved biometric voice characteristics have turned out to be particularly useful in order to determine fraud based on manipulated voice utterances.

It may therefore be advantageous to have the biometric voice characteristic or data derived therefrom to be determined at least 50, 100, 200 or 500 times within each voice utterance.

Preferably, the similarity of the two received voice utterances is not determined using a Gaussian Mixed Model (GMM), which may be obtained from each of the voice utterances, since such a GMM does not preserve the temporal evolution of any characteristic.

Preferably, the biometric voice characteristics of the two voice utterances, or data derived therefrom, which are used for determining the similarity are data which are time dependent, or in other words, time resolved. This means that for each data a specific time indication is stored.

The biometric voice characteristics used for determining the similarity of two voice utterances preferably comprise or are based on a set of values wherein such values may be arranged in a vector or a matrix or any other data structure wherein each set of values is determined from a time slice of the voice utterance with the length of, e.g. between 10 to 40 milliseconds and the number of values preferably is between 2 and 40, such as between 10 and 30.

Furthermore, it is advantageous to have sets of values which also include an indication of the difference between some values and corresponding values of another set of values, in particular, a temporarily previous or following set. Thereby, it is possible to capture biometric characteristics based on the changes of other biometric characteristics.

The determined biometric voice characteristics may be used to derive other values such as a set of m values. Here, for example, the coincidence of a set of values as explained above with respect to a statistical voice model such as a Gaussian Mixed Model may be expressed. This statistical voice model may be given based on statistical voice model components and the coincidence of a set of values of the biometric voice characteristic with respect to each of the statistical voice model component may be calculated.

This statistical voice model used hereby can be a voice model particular for the speaker the identity of which is to be verified. Such a statistical voice model specific for the speaker the identity of which is to be verified is present anyway, since this statistical voice model may be the one used for verifying that this speaker's voice corresponds to the speaker the identity of which is to verified.

On the other hand, also a generic model independent of a particular speaker can be used, for example a universal (background) model can be used, which means that the statistical voice model used for determining the similarity of two received voice utterances is independent of the identity which is to be verified.

Preferably multiple sets of values and/or multiple derived sets of values are calculated for different time slices within the voice utterance of each of the two voice utterances, such that the temporal evolution of certain biometric voice characteristics or data derived therefrom can be analyzed in order to determine the similarity of two received voice utterances.

Two voice utterances may be analyzed in order to determine this similarly thereof by using correlations calculated for a specified value or a specific subgroup of values of the sets of values or of the derived sets of values. This offers a wide range of possible calculations of the similarity which allows for a broad spectrum of possible ways to identify the similarity between two received voice utterance and therefore to identify fraud.

The method, in particular, indicates that the identity of a speaker based on the speaker's voice is positively confirmed or verified in case that the analysis of both voice utterances using biometric voice data to verify that the speaker's voice corresponds to the speaker the identity of which is to be verified gives a positive result, which means that the test indicates that the speaker's voice indeed corresponds to the identity which is assumed, and furthermore, that the similarity of the two voice utterances is found to be below a threshold which means that the similarity is not suspiciously high. The determination that the similarity is below a threshold is the same as determining that the dissimilarity is above a threshold. Other ways for deciding about similarity or dissimilarity without the use of a threshold are possible as well, such as neutral networks.

Advantageously, the similarity may also be checked against by a minimum threshold indicating that the similarity has to be at least given in some respect. Otherwise, the two voice utterances could be provided in a completely different way in order to pass the similarity test. This test may render another test, which checks the semantic content of the voice utterances or takes the semantic content into account as superfluous.

Further, it is advantageous to have some test of the first and second voice utterance which depends on the semantic content of the voice utterance. For example, by speech recognition it may be determined that the semantic content of the received voice utterance indeed corresponds to the requested content (text, word, digit, letter, etc.). Further, it is possible to use a statistical voice model of a speaker in order to verify his identity, which is specific to a semantic content such as a Hidden Markov Model. Nevertheless, the statistical voice model used for verifying the identity may be a Gaussian Mixed Model.

Biometric voice data may be extracted from a voice utterance by a frequency analysis of the voice. From a voice utterance sequences of, e.g., 20 or 30 milliseconds may be Fourier transformed and from the envelope thereof, biometric voice data can be extracted. From multiple of such Fourier transformed voice sequences a voice model can be generated, (e.g. in a training phase of an access controlling system) named a Gaussian Mixed Model (GMM). The extracted biometric voice data may be evaluated with a previously generated statistical voice model in order to verify that the speaker's voice corresponds to the speaker the identity of which is to be verified. However, any other voice data that allows distinguishing one voice from another voice due to voice characteristics may be used. Also, voice characteristics that take into account that the voice utterance refers to specific semantic content can be considered. For example, Hidden Markov Models (HMM) may be used which take into account transmission probabilities between different Gaussian Mixed Models, each of which refers to a sound or letter within a word.

The invention furthermore refers to a system for verifying the identity of a speaker according to the features of claim 14.

Preferred embodiments of the invention are disclosed in the figures. The preferred embodiments are not to be understood as exposing a limitation of the invention and rather are provided in order to explain a particular useful way of carrying out the invention.

It is shown in:

FIG. 1 a schematic indication of a method for carrying out the invention;

FIG. 2 a schematic view of how to extract biometric voice characteristics;

FIG. 3 an explanation of dynamic time warping

Figure 4B:
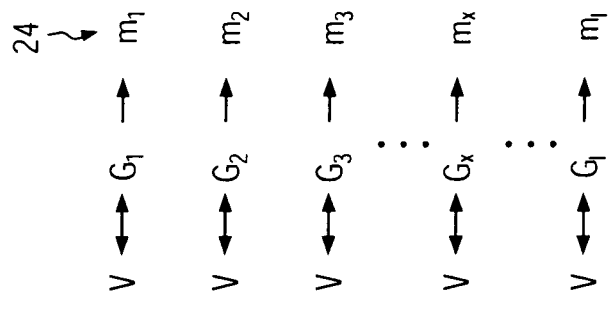
Figure 5:
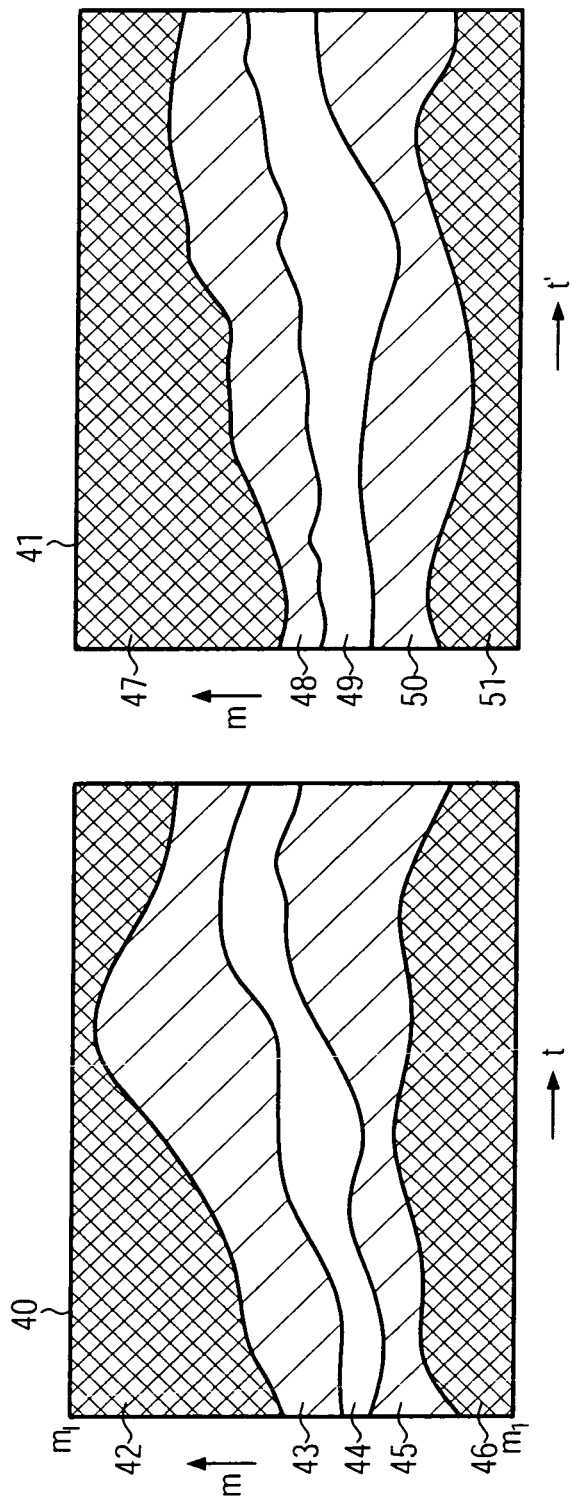
Figure 6:
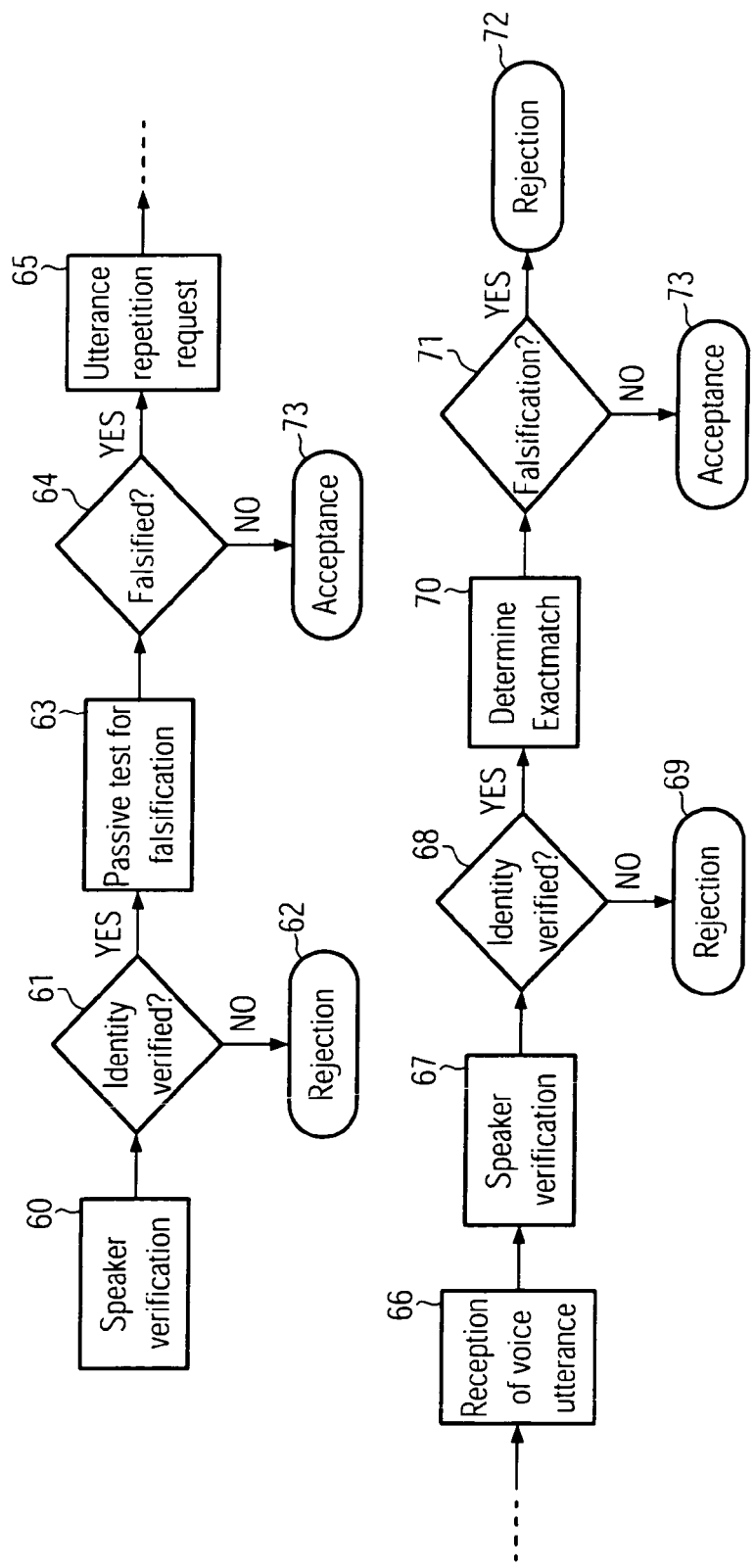

FIG. 4 a schematic view of how to obtain a derived set of data;

FIG. 5 a schematic view for explaining correlation between data;

FIG. 6 another preferred embodiment for carrying out the method; and

Figure 7:
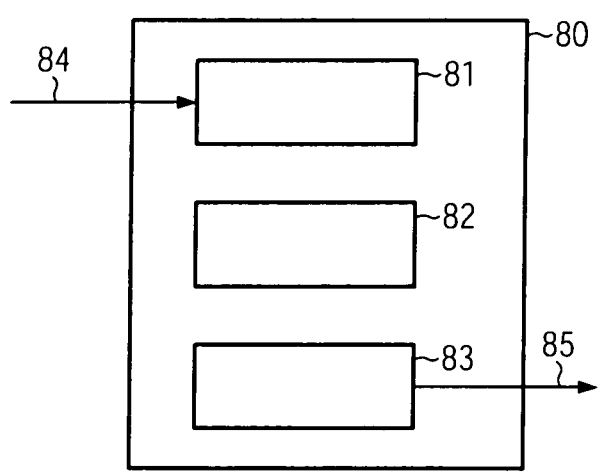

FIG. 7 a schematic view of the system.

FIG. 1 shows an example of a method. Here, in step 1 a first voice utterance is received. Based on this received voice utterance a speaker verification is performed (step 2). Hereby, biometric voice data are extracted from the voice utterance and are compared with the statistical voice model such as the Gaussian Mixed Model or Hidden Markov Model. In step 3 it is decided whether the identity is considered to be verified. If not, the speaker is rejected in item 4, otherwise it is proceeded to item 5. Here, a second voice utterance is received. Before step 5 and after step 3 another step may be given which requests the speaker to provide the second voice utterance. In item 6 a second voice utterance is processed in order to verify the speaker. Hereby, in a similar way as to step 2 biometric voice data are obtained from the voice utterance and are, for example, checked against a statistical voice model such as a Gaussian Mixed Model or a Hidden Markov Model.

In item 7 it is decided whether the identity of the step 6 is considered to be verified or not. If not, the speaker is rejected in item 4, otherwise it is proceeded to the step 8. In this step the similarity between the first and the second voice utterance is determined. If the voice utterance is found to be suspiciously similar, it is proceeded to rejection step 4 otherwise it is proceeded to acceptance.

The determination of the similarity between the first and the second voice utterance can also be performed directly after having received the second voice utterance in step 5. The speaker verification of item 6 may then only be preformed in case that the similarity is found not to be suspiciously similar. Also the speaker verification of step 6 and the determination of similarity in step 8 may be processed in parallel. The results of each of the decisions of items 7 and 9 may be combined in order to decide whether or not the speaker is to be rejected or accepted or other further steps before deciding about acceptance or rejection are carried out.

Further, instead of the acceptance in item 10 other tests may be carried out in order to check for fraud before accepting a speaker, such as a liveliness test (see PCT/EP2008/010478, FIGS. 4 and 5).

In FIG. 2a the intensity 15 of a voice signal as a function of time t is shown. This can be the intensity of the signal of the first or of the second voice utterance. Schematically are shown different time slices $T_1$, $T_2$, $T_3$, which are defined as overlapping time slices. The time slice $T_1$ extends from time 11 to time 13, $T_2$ from time 12 to time 14 and $T_3$ from time 13 to a time later than time 14. As can be seen, the time slices may overlap as the time slices $T_1$ and $T_2$, for example overlap in the time between time 12 and 13.

For each time slice, biometric data or biometric characteristics may be calculated. For example, for each time slice the signal portion 15 may be Fourier transformed and the envelope thereof may be determined from which characteristic biometric data may be obtained as shown in FIG. 2b. Here it is shown that for each time slice, for example the set of values here, in particular, vector 16 is obtained, each vector or each set of values having n values, and n may be, for example a number between 10 and 30 or between 15 and 25. From those data, other sets of data may be obtained such as indicated with reference sign 17. Here, for a time slice $T_2$ the first half of the values are identical to the set of values 16 and the differences between the set of values 16 of time slice $T_1$ and the corresponding ones of $T_2$ are added as the second n values. The value $\Delta C_1^2$ corresponds to the difference between $C_1^1$ and $C_1^2$. Thereby sets of values or vectors 17 having two times n values are obtained.

Figure 3A:
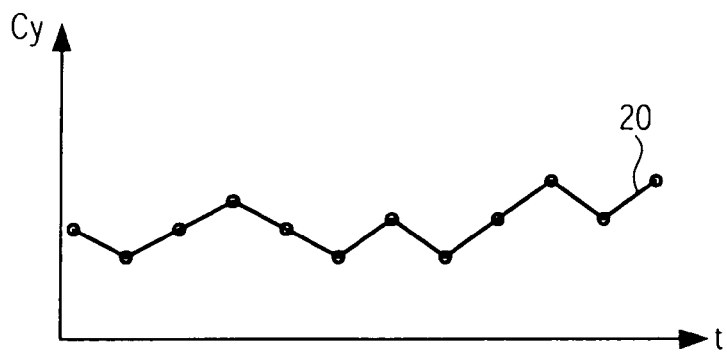

In FIG. 3a the temporal evolution of any of the characteristics Cy of FIG. 2 is shown. For each time slot one such value is calculated and corresponds to a data point in FIG. 3a.

For each voice utterance more than a 1,000 or more than 10,000 time slices may be evaluated in giving more than 1,000 or more than 10,000 data points in FIG. 3a.

A temporal evolution of such a characteristic Cy between two different voice utterances may be compared.

In FIG. 3a only one characteristic Cy of the vectors 16 or 17 is shown, however, such comparisons between two voice utterances may be based on at least two, three or five such characteristics C of the sets of values. Preferably, only a sub group of values of the set of values 16 or 17 is used for determining the similarity.

Figure 3B:
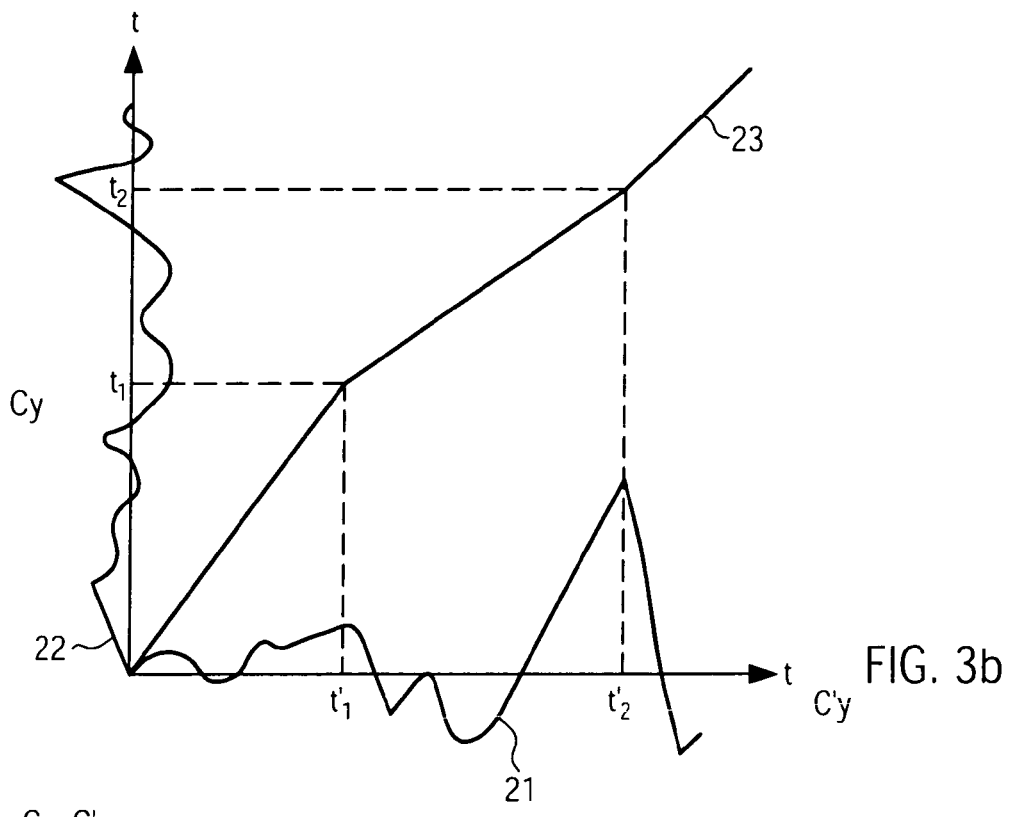

In FIG. 3b a particular example of applying dynamic time warping is shown. Characteristic Cy, for example corresponds to first voice utterance and the characteristic C'y corresponds to the corresponding characteristic of the second voice utterance. As shown in FIG. 3b each of the characteristics has a temporal evolution corresponding to the temporal evolution of the thereof shown for FIG. 3a.

Line 23, in FIG. 3b indicates how one time axis t is matched onto the other time axis t'. Thereby, the time interval from 0 to $t_1$ and the time interval from 0 to $t'_1$ are linearly matched to each other, although they have different real time lengths. The time interval from 0 to may be for 200 milliseconds and the time interval to 0 to $t'_1$ 170 milliseconds. The data of one of two voice utterances is temporarily expanded or squeezed together, such that the two intervals correspond to a same interval such as, e.g. 200 milliseconds. The time interval from $t_1$ to $t_2$ and $t'_1$ to $t'_2$ is in a different way. Line 23 does not have to be composed of straight segments, but may also be a curved line.

With the dynamic time warping as shown in FIG. 3b, each time indication for one voice utterance is mapped to another time indication on the other voice utterance such that at least for one of the two voice utterances some time intervals are stretched or compressed.

Figure 3C:
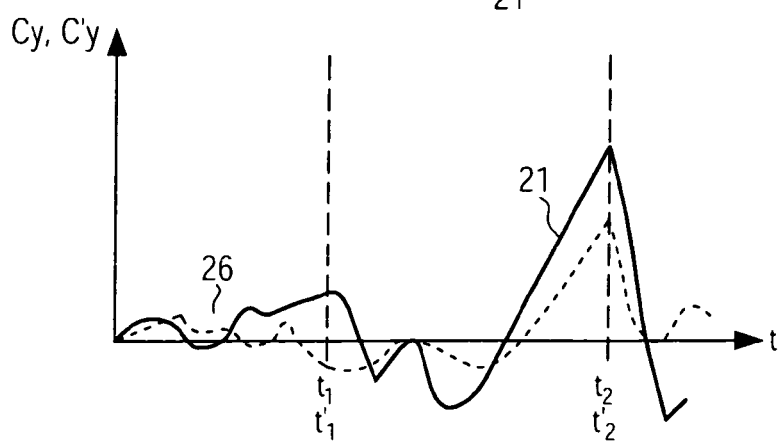

In FIG. 3c it is, for example, shown how the curve 22 has been transferred by the dynamic time warping process to the curve 24, while curve 21 corresponding to C'y has not been changed. The two curves shown in FIG. 3c can be compared with each other in order to determine the similarity between two voice utterances, for example by calculating a correlation of the two curves. As mentioned above, not only the correlation between one value $C_y$ and $C'_y$ may be calculated but two, three, four or more characteristics such that multidimensional correlations are calculated.

Figure 4A:
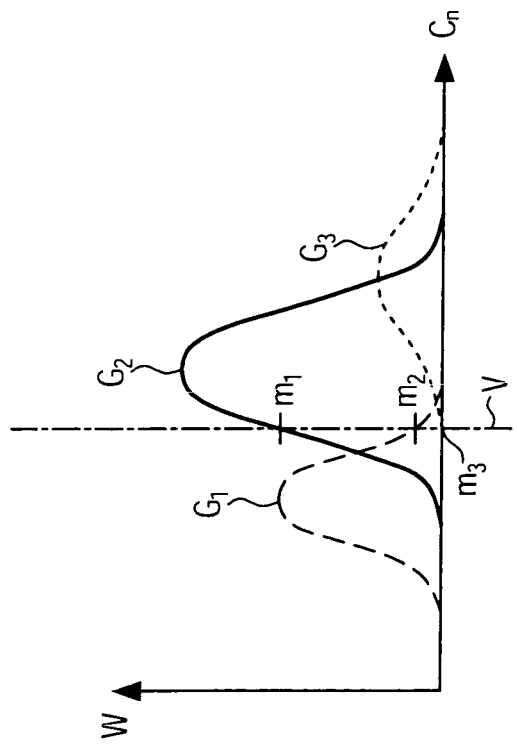

A set of values which represent the biometric voice characteristics used for determining the similarity of two voice utterances may be compared to a statistical voice model. This is schematically shown in FIG. 4a. For explanation in FIG. 4a, a statistical model composed of three Gaussians G1, G2, G3 (statistical voice model components) is shown. Please note that in FIG. 4a, for simplicity of explanation one-dimensional Gaussian are used having only one dimension indicating the probability W of the value of Cn for particular value. A statistical voice model typically has more than 500 or 1000 and preferably less than 2000 components. The number of components is named l.

A specific value v of the characteristic Cn is present according to the different Gaussians G1, G2 and G3 with a different probability W. This probability W, according to each of the Gaussians G1, G2, G3 leads to the value m and is shown in vector 24 in FIG. 4b.

Specifically, the probability W(v) that the characteristic Cn has the value v is calculated for expressing the coincidence of a biometric voice characteristic with a statistical voice model. This is an example of deriving a set of values from a set of values of biometric voice characteristics. The derived set of values may have, for example the same number (l) of values as there are numbers (l) of components of the statistical voice model.

Such a derived set 24 may be derived for multiple time slices T. Hence, the temporal evolution of each of the values of m can be calculated similar to the one explained in FIG. 3a. Hereby a matrix of size l times the number of time slices for which a data set was derived is obtained (for each voice utterance). In the matrix only a subset (i.e. not all) of the l values may be further taken into account for determining the similarity, for example only l/2 or l/3 values (times the number of time slices for which a data set was derived).

The temporal evolution of any of the values can be used to determine correlations between two voice utterances. Hereby, also dynamic time warping may be performed.

In FIG. 5 another possible analysis in order to determine the similarity of two voice utterances is shown. In this figure two images are shown. One axis of the images refers to a time axis and the other image refers to coefficient numbering of the set of values 24. This means that one derived set of values 24 corresponds to one column of the data shown in FIG. 5. Instead of using the values of the derived set of values, the biometric voice data of the set of values 16 or 17 can be used.

If the data shown in FIG. 5 are considered to be images such as black and white images the actual value of a number mx would correspond to the brightness. The image would have l number of lines. For each voice utterance the image 40 or 41 calculated. High values of a value $m_x$ would correspond to a bright indication in the image such as shown in stripes 44 and 49, while low values would correspond to darker portions such as shown in regions 42, 46, 47 and 51. Medium values would lead to intermediate brightness indication such as in zones 43, 45, 48 or 50.

The data sets 40 and 41 shown in FIG. 5 can be analyzed in various ways in order to determine the similarity of the two received voice utterances. For example, image correlations may be calculated taken into account all data. Also, only data with a value of m being above a certain threshold much and the values in regions 43, 45, 44 together with the regions 48, 49 and 50 may be analyzed.

Also, dynamic time warping for the data sets 40, 41 may be carried out in order to compare the two data sets.

In FIG. 6 another preferred embodiment of the method is shown. In step 6 speaker verification (corresponding to step 2 in FIG. 1) is carried out. In step 61 it is decided whether the identity is considered to be verified or not, if not the speaker is rejected (62) otherwise a passive test for falsification 63 is carried out. A passive test for falsification does not request any further input from a speaker apart from first received first voice utterance. In this respect it is referred to explanations and definitions of a passive test for falsification disclosed in the above-mentioned PCT application PCT/EP2008/010478.

In case that the passive test for falsification considers the voice utterance to be falsified in item 64, in item 65 a second voice utterance is requested which is received in item 66. Here, the speaker verification of the second received voice utterance is performed in item 67 and evaluated in item 68. If the identity of the speaker can not be verified, the speaker is rejected in item 69. If the identity can be verified, it is proceeded to calculate the determination of an exact match in item 70. The determination of the exact match according to the present method is done by calculating the similarity of the two received voice utterances using biometric voice characteristics. If this test indicates a falsification in item 71 the speaker is rejected in item 72, otherwise it is accepted in item 73.

The herein described determination of the similarity of the two received voice utterances can be carried out as a determination of an exact match in each of the cases mentioned in the above-mentioned PCT application PCT/EP2008/010478. Disclosure of this application is therefore fully included in the present application by reference, each of the methods mentioned in PCT/EP2008/010478 which mentions an exact match is considered to be included and disclosed herein by reference.

FIG. 7 shows a particular embodiment of a system 80 having a component 81 for receiving a first and a second voice utterance through input 84.

Furthermore, a component 82 is shown for using biometric voice data to verify that the speaker's voice corresponds to the speaker the identity of which is to be verified based on the received first and second voice utterance.

Furthermore, a component 83 for comparing the two received voice utterances in order to determine the similarity of the two voice utterances is shown. This component 83 uses biometric voice characteristics of the two voice utterances or data derived from such biometric voice characteristics in order to determine the similarity of the two voice utterances. The result of the verification of the identity is output by means 85.

The invention claimed is:

1. A method of verifying, using analysis of a speaker's voice, a specific identity of a speaker, the method comprising the steps of:
   a) receiving, at a first software component of an electronic access control system, a first voice utterance and a second voice utterance;
   b) verifying, using biometric voice data extracted from the first and second received voice utterances and using a second software component of the electronic access control system, that the speaker's voice corresponds to a specific identity; and
   c) determining, using a third software component of the electronic access control system, an indicia of similarity of the two received voice utterances, wherein the indicia of similarity is determined using analysis of the extracted biometric voice data of the two received voice utterances;
   wherein the extracted biometric voice data used for determining the indicia of similarity of the two received voice utterances comprise or are based on a first set of at least n values, wherein the first set of at least n values is determined from a time slice of one of the received voice utterances, the time slice having a length of between 10 and 40 ms, wherein n is a number between 2 and 40;
   wherein if the speaker's voice has been verified, using biometric voice data, to correspond to the specific identity, the second received voice utterance is requested from the speaker;
   wherein the speaker is requested to repeat the first voice utterance in order to receive the second voice utterance; and,
   wherein data derived for the first voice utterance is determined at least 50 times for the first voice utterance and data derived for the second voice utterance is determined at least 50 times for the second voice utterance.

2. The method of claim 1, wherein a set of biometric voice data is extracted from the two received voice utterances and the extracted set of data is used as biometric voice data for verifying that the speaker's voice corresponds to the specific identity and as biometric voice characteristics for determining an indicia of similarity of the two received voice utterances or for deriving data for determining the indicia of similarity of the two received voice utterances.

* * * * *